United States Patent [19]

Nakajima et al.

[11] 4,100,009
[45] Jul. 11, 1978

[54] METHOD OF AND APPARATUS FOR PRODUCING HOLLOW-CYLINDRICALLY SHAPED FIBROUS ARTICLES

[75] Inventors: Takayoshi Nakajima, Moriyamashi; Hiroshi Sonoda, Shigaken; Katsutoshi Sasaki, Shigaken; Teruaki Hane, Shigaken, all of Japan

[73] Assignee: Chisso Corportion, Osaka, Japan

[21] Appl. No.: 794,697

[22] Filed: May 6, 1977

[30] Foreign Application Priority Data

May 8, 1976 [JP] Japan .................................. 51-52323
May 25, 1976 [JP] Japan .................................. 51-60499
Nov. 2, 1976 [JP] Japan .................................. 51-132028

[51] Int. Cl.$^2$ .......................................... B65H 81/00
[52] U.S. Cl. .............................. 156/184; 210/494 R; 210/508; 428/36; 428/296
[58] Field of Search ............. 156/166, 167, 184, 173, 156/169, 446, 458, 499, 62.2, 62.6, 181, 175; 428/35–36, 296, 906; 210/494 R, 497.1, 502, 504, 508, 509; 138/DIG. 2; 19/159 R, 149

[56] References Cited

U.S. PATENT DOCUMENTS 2,500,282  3/1950  Francis .............................. 428/296
3,479,239  11/1969  Hullhorst .......................... 428/36 X
3,904,798  9/1975  Vogt et al. ........................ 428/36
3,952,121  4/1976  Dilo .................................. 428/36

*Primary Examiner*—David A. Simmons
*Attorney, Agent, or Firm*—Fred Philpitt

[57] ABSTRACT

A method for producing a hollow-cylindrically shaped fibrous article stabilized by hot adhesion and an apparatus suitable to produce the same are provided. Said method comprises passing a web of gathered fiber layer carried on a conveyor belt through a heating zone, heating said web in such a way that a lower-melting component of composite fiber contained in the lower part of said web contacting the conveyor belt is not in the molten state and a lower-melting component contained in the upper part of said web is in the molten state, while separating said web from the conveyor belt, winding up said web on a take-up rod or tube in such a way that the upper surface thereof occupies the inner side of the winding, while heating the web further, cooling the wound up article and drawing out the take-up rod or tube from the shaped product.

The production method of the present invention is simple and does not require complicated apparatus and the resultant product is useful for filtration.

9 Claims, 1 Drawing Figure

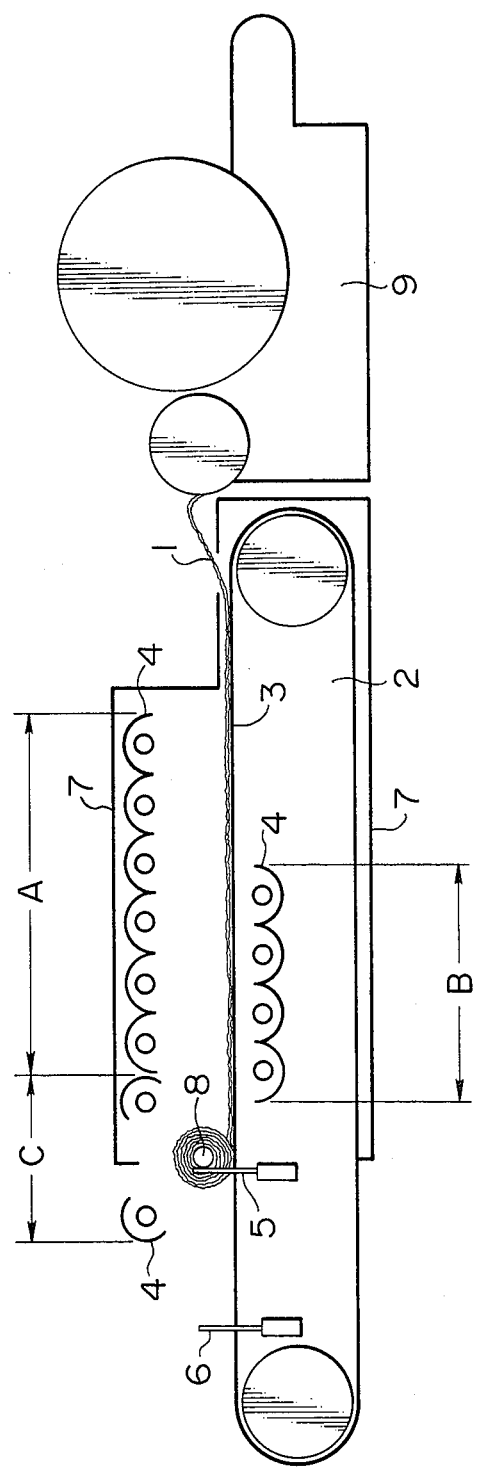

METHOD OF AND APPARATUS FOR PRODUCING HOLLOW-CYLINDRICALLY SHAPED FIBROUS ARTICLES

DETAILED DESCRIPTION OF THE INVENTION

The present invention relates to a method and an apparatus for producing a cylindrically shaped fibrous article having a central hollow portion (which will be referred to hereinafter as hollow-cylindrically shaped fibrous article) which are stabilized by hot melt adhesion.

Heretofore, sintered metals, windings of laminated spun yarns or shaped articles of bond synthetic or natural fibers have been used as air-permeable or water-permeable hollow-cylindrical articles. Recently, however, porous hollow-cylindrically shaped fibrous articles stabilized by hot melt adhesion have been developed by using hot melting adhesive composite fibers. They are drawing attention because of their various excellent properties such as high grade of stability, superior performances as filter or a coarse-oil-particles-forming agent in waste liquor due to the good shape of gaps or vacant spaces contained therein, a broad gap size ranging as wide as from micron order to millimeter order, an improved collection efficiency with gradient gap size distribution, etc.

Although these hollow-cylindrically shaped fibrous articles have above mentioned excellent properties as well as utility, they have been produced so far by charging a web containing hot melt adhesive composite fibers into the spaces between two cylinders, as shaping frames which are a concentric combination of an outer tube and an inner tube followed by heat treatment, cooling and then removal from the shaping frame. However, since charging of the fibers is carried out from one end into the shaping frame, there is the restriction as to the length of the shaping frame. Since the whole shaping frame is to be heated, there is the restriction of the thickness of the article. According to this method even if there is a merit in this process that various relief patterns may be made on the surface of the shaped article by a pattern of the mold, what are produced are only small articles and mass production was difficult even for small articles because many shaping frames and operators have been required. Because of this fact, they could not have satisfied the large demand in such a field as filtration or purification treatment of industrial waste liquor or sewage.

The object of the present invention is to provide methods as well as apparatus for producing hollow-cylindrically shaped fibrous articles which satisfy the above mentioned requirements and produce such articles freely, big or small, in a simple manner without using a shaping frame.

According to the process of the present invention a hollow-cylindrically shaped fibrous article stabilized by hot melt adhesion is produced by passing a web of gathered fiber layer having a constant width, containing at least 10% of hot melt adhesive composite fibers comprising a lower melting component and a higher melting component, in which fibers said lower-melting component adheres to other materials while it is in the molten state and carried on a conveyer belt through a heating zone, causing said lower melting component of said composite fibers contained in the lower part of said web of gathered fiber layer contacting the conveyer belt to be brought to not-melted state but the same component of said composite fibers contained thereabove to be brought to molten state, separating said web of gathered fiber layer from the conveyer belt and winding it on a take-up rod or tube (which will be referred to simply as a take-up rod) so as to have the upper surface occupy the inner side of the winding, further heating during the course of winding, the lower part of said web of gathered fiber layer which has been contacting the conveyer belt but is now in the exposed state after the separation in order to cause said lower-melting component of said composite fibers in said lower part to be brought to the molten state, adjusting the vacant space proportion during the course of the above steps or even after the completion of winding, cooling the article thus obtained after accomplishing the desired vacant space proportion of the final winding, and drawing out the take-up rod from the product.

The vacant space proportion of the hollow-cylindrically shaped fibrous articles is generally from 50% to 90% and in order to make the shape of vacant space better, hot-melting adhesive composite fibers having natural or mechanical crimps are used. Such an aggregate of crimped fibers have bulkiness and resilience and is fed into a shaping frame by using such an apparatus as an air cylinder because a considerable power is required in case of conventional shaping frames. If said heat-melting component is brought to the nearly molten state by heating at a melting temperature in advance, however, it is possible to reduce its bulkiness and resilience while maintaining not only the same original fiber shape but also nearly the same crimp shape as those before the heating, even after the heating by virtue of other not-melted component of the composite structure. This makes it possible to reduce the apparent volume with a much smaller pressure and at the same time the holt melt adhesion at the contacting parts of the fibers is further strengthened. Therefore the web of gathered fiber layer thus subjected to heat treatment in advance still contains a large amount of vacant space under the condition that no other pressure is imposed except for the gravity loaded only upon the fibers. However, the vacant space proportion can be reduced by applying a small pressure during the course of winding. According to the present invention hollow-cylindrically shaped fibrous articles being stabilized by hot melt adhesion of fibers and having a small vacant space proportion may be efficiently produced regardless of the thickness thereof by winding a relatively thin, easy-to-heat and easy-to-compress web of gathered fiber layer while applying the above-mentioned operations.

The present invention will be described more fully hereinafter. It is important to consider the mutual relationship between the time of arrival to the molten state of lower melting component of heat-melting composite fibers and the time of winding thereof in the step of travel, heating and winding of the gathered fiber layer. According to this invention a relatively thin, easy-to-heat and easy-to-compress web of gathered fiber layer is successively wound up and piled up while on heating to cause melt adhesion of fibers to occur within a layer or between two layers resulting in a final winding in which hot melt-adhesion is accomplished throughout the layers. Accordingly, at the time of winding and piling the surface of the outer layer of the already formed winding and the upper surface of a fiber layer to be newly wound thereupon must be in the state capable of effecting adhesion between each other, i.e. the lower-melting component must be in the molten state. However, if the web of gathered fiber layer on the belt conveyer is heated to such an extent that the lower melting component is brought to molten state throughout the whole thickness thereof at the time when it is separated from the conveyer belt for the purpose of winding, the web of gathered fiber layer and the conveyer belt are brought to the adhered state and the state of web of gathered fiber layer is disturbed in the separation. This is not preferable. On this account, heating on a conveyer belt is so controlled that in the lower portion of a web of gathered fiber layer contacting the conveyer belt, the lower-melting component is brought to the heated state but not yet melted state, i.e. in the stage slightly in advance of melting but in the upper portion, the lower melting component is brought to the melted state.

In order to heat a web of gathered fiber layer with different heating extents between the upper and lower part of said seb of gathered fiber layer, the irradiation with infrared light heaters from above a conveyer belt will be sufficient when a conveyer belt made of relatively dense material is employed because the upper layer is irradiated by greater amount of heat ray to elevate its own temperature but the temperature of the lower part is elevated to an appropriate degree lower than that of the upper part even though the lower part is irradiates by lesser amount of heat rays as compared with the upper part. Whereas, if a conveyer belt which allows air to pass freely or made of porous material such as metal net or the like is employed, irradiation from below the conveyer belt to the back surface of the belt is necessary since an infrared ray heaters only from above is insufficient to raise the temperature of the lower part. Further it is also possible to effect a heating capable of producing the difference of temperature between the upper and lower parts by conducting aeration of hot air from above the conveyer toward below the conveyer and adjusting its rate to a moderate flow.

After the web of gathered fiber layer is smoothly separated from the surface of conveyer belt, an additional heating to the lower layer part of the web of gathered fiber layer is carried out during the period of winding of the web of gathered fiber layer on a take-up rod for some time until a subsequent web of gathered fiber layer is piled thereupon, and thus the lower-melting component in said lower layer part is brought to the molten state resulting in the complete hot-melt-adhesion of fibers in said lower layer part and between said part and the layer piled thereupon. Thus the separation from the conveyer belt, winding and hot-melt-adhesion are smoothly carried out.

Further if the time of applying a pressure for the adjustment of vacant space proportion is to be considered, it is preferable that fiber aggregate is in the sufficiently heated state in order that the adjustment of vacant space proportion can be carried out by applying a pressure and the winding of fiber layer is carried out preferably in the state where the adjustment of vacant space has been nearly completed.

By considering the above-mentioned mutual relationships of heating conditions, time of winding and time of applying pressure collectively, the most practical and best method is provided, in which a web of gathered fiber layer is heated to give different temperature between the upper and lower layer parts as explained above and is wound up on a take-up rod while being forwarded by the surface drive of the conveyer belt and by the pressing exerted upon the contact surface of the web of gathered fiber layer with the surface of the conveyer belt by the own weight of a winding at a certain point. If it is necessary to adjust the own weight of winding itself, it is possible to use a conventional procedure, conventional weighing means such as application of weights, springs or the like on both the ends of the take-up rod. Thereafter the back surface of the web of gathered fiber layer which has been separated from the conveyer belt and exposed to air is additionally heated during the course of winding.

Another method for the adjustment of the vacant space proportion is explained hereinbelow. As mentioned before, fibrous polymers especially those having crimped fibers have bulkiness and resilience. But such characteristics are reduced by heating. In the present invention, heating temperature falls between the melting points of the two components of the hot melt adhesive composite fiber and the temperature affects also the softness of the high-melting component depending upon whether it is close to the upper limit or the lower limit even though it is said that the lower-melting component is in the molten state. Hence the reduction of degree of bulkiness or resilience of the web of gathered fiber layer also differs according to the temperature. Therefore the vacant space proportion can be adjusted also according to the heating degree of the web of gathered fiber layer even when the pressure for this purpose including the aforementioned own weight of winding is kept same in the above-mentioned adjustment by way of the own weight of winding. Thus, more intensive the heating, lower vacant space proportion and vice versa. As to heating adjustment of such purpose, either heating carried out during the course of transportation of the web of gathered fiber layer by a conveyer or heating after the separation of said layer from the surface of conveyer belt is employed but adjustment by using both the above-mentioned heating way is also possible.

The hollow-cylindrically shaped fiber article which is the subject matter of the present invention provides, as described above, excellent effectiveness such as increased take-up capacity, extended life as a filter or improved performance for forming coarse particles by holding a gradient in the size of vacant space(cells) toward the direction of liquid flow in case of filtration (i.e. from outer surface of the shaped articles to the surface of central hollow portion, or vice versa). The production of such shaped articles having a gradient in the size of vacant space can be readily provided according to the present invention by using the above-mentioned method for the adjustment of vacant space proportion. Namely, according to one of such methods, a pressure applied to the fiber layer during the winding thereof is changed with elapse of time. For example the tension of the springs attached to a take-up rod may be increased or decreased with the progress of wound amount. According to another method heating grade of the web of gathered fiber layer is increased or decreased with the progress of winding. Although it is also practically feasible to change heating grade during the course of travel on the conveyer belt but the following is the most preferable among various adjusting methods including the above-mentioned pressure changing method. That is, a method in which heating grade on the transportation conveyer is kept constant (for that purpose heat sources may be either hot air or fixed infrared light heaters) and infrared light heaters are also employed for the heat source after the separation of a web of gathered fibrous fiber layer from the conveyer belt and it is moved away from or toward said web with progress of winding.

When the amount of web of gathered fiber layer wound as described above has reached a prescribed amount, winding is stopped and the web of gathered fiber layer is cut off. If winding is carried out by the rotation on the surface of conveyer belt the cutting may be done with a knife or hot wire when the wound article is moved by separating from the conveyer belt. The use of hot wire is preferable. After the winding is stopped the supply of web of gathered fiber layer may be temporarily stopped, or, in the case of continuous production described hereinbelow, the supply may be continued without interruption. The vacant space proportiion of the wound article is, if necessary, adjusted by applying a pressure upon the outer surface of the article while rotating it either while it is still hot or by placing it in the hot atmosphere.

On the surface of the wound article finished as described above, many various kinds of protrusion and depression can be made. The effect of such ruggedness lies in that it enlarges the surface area of the filter and delays the saturation of the clogged filter surface when waste liquor is passed from the outer surface of the shaped article to the central hollow portion, or its strengthens the retention of formed coarse oil particles on the surface, retarding the separation of oil from the surface and further coarsening the particles when an oil containing waste liquor is passed from the central hollow portion towards the surface to effect coarsening of oil particles, etc. The pattern of such ruggedness may be arbitrarily selected. For example, scattered points of protrusion and depression or many mutually adjacent ridges and grooves arranged in various directions such as those along the circumference, in the direction of the axis of the cylinder or in oblique directions, etc. may be arbitrary selected. In order to arrange such a rugged pattern on the surface of the shaped article, it is pressed against a moving surface having a corresponding rugged pattern thereupon under a certain pressure such as the weight of the shaped article itself while it is in rotation after the above mentioned winding has been completed but the shaped article is yet hot preferably while holding a temperature of winding by heating. As the moving surface the surface of the conveyer belt may be utilized in addition to the surface of a separate cylinder rotating around its axis. In the present invention such materials as wire netting, or wire conveyer belt may be employed for a conveyer belt in addition to those having a common smooth surface.

The resulting winding which has been completed as described above and on which rugged pattern has been further optionally arranged is cooled. The cooling need not be carried out in a specially prepared atmosphere at a low temperature. Allowing articles to stand to radiate heat in the atmosphere at room temperature will be sufficient. Cooling is preferably conducted with as low a loading as possible since the wound article deforms readily until it becomes hard enough as a shaped fiber article after cooling and solidification of hot melt adhered sites of composite fibers.

After the cooling, the take-up rod can be drawn off from the winding after exerting a certain extent of shock by applying a force. The resultant article is cut into a prescribed length to give hollow-cylindrically shaped fibrous articles. If the width of the sheet of web of gathered fiber layer is made to an integer number times as wider as that of the objective article, it will be efficient because a plurality of products are produced at one time by the cutting after a take-up rod has been drawn out.

When the method of the present invention described hereinabove is carried out continuously a notable effectiveness can be obtained. The continuous operation is carried out as follows.

Namely, when winding is completed, a winding is separated from a winding site, i.e. from the driving surface of revolution, and at the same time the web of gathered fiber layer is cut off. Then an empty take-up rod is placed on the vacant winding site to allow it to rotate. In case of the method described above in which a winding site is at a prescribed position on a conveyer belt and rotation is derived by the movement of the driving surface of the conveyer belt, an empty take-up rod placed on the winding site of the conveyer belt immediately begins to rotate and winding is started again when it touches the leading end of a web of gathered fiber layer. In this case heating of the take-up rod in advance will insure automatic winding by forming hot melt adhesion between the composite fiber and take-up rod. Although heating temperature is preferably to be in such an extent as same as that of said web of fiber layer, precise control of temperature will not be needed. It does not matter even when there is a temperature difference of about 10° C. The windings moved from the winding site is immediately sent to the subsequent steps such as cooling (if necessary cooling is carried out after embossing of rugged patterns and adjustment of vacant space proportion), and further, drawing out of the take-up rod. In this instance the subsequent steps such as cooling may be carried out while allowing a winding to rotate on a conveyer belt for driving a web of gathered fiber layer, with its own weight at a certain position ahead of the winding site. In this method a rugged pattern corresponding to the surface of the belt is given. Thus an objective shaped article can be continuously produced by changing take-up rod without stopping the supply of a web of gathered fiber layer.

As hot melt adhesive composite fibers used in the present invention, composite fibers comprizing two or three or more fiber forming thermoplastic resins having different melting points, in which lower-melting component occupies at least a part, preferably 60% or more as a circumferential ratio in a cross section of the fiber and which form hot melt adhesion of fibers by heat treatment may be employed irrespective of whether they are sheath-core type or side-by-side type. Preferred examples are side-by-side type. Preferred examples are side-by-side or sheath-core type composite fibers comprising polypropylene and polyethylene which have melting points difference of 20° C or greater. Other fiber forming thermoplastic resins include polyesters, polyamides, polyacrylonitrile, polyvinylalcohol, and polyvinylchloride.

As webs of gathered fiber layer for forming cylindrically shaped fiber articles, mixtures of hot melt adhesive composite fibers with natural or other synthetic fibers may be used so long as the latter do not melt or deteriorate at the adhesion temperature of the composite fibers, in addition to those which contain wholly above-mentioned hot melt adhesive composite fibers. The mixing ratio of other fibers is preferably 50% or lower in order to have a sufficient strength as a fiber shaped article. As for thickness fibers of one to 1000 denier may be used. As for length both of short fibers and long fibers are useful. As to the state of aggregation of webs of gathered fiber layer to be supplied, those having been subjected to carding, tow having been subjected to opening or long fibers distributed on a flat surface at random by throwing out, etc. are freely employed.

The distribution of weight of fiber per unit area in the fiber layer is preferably as uniform as possible in order to make a vacant space proportion after heating and winding uniform.. It is preferable that Metsuke i.e. a weight per unit area is not too heavy for easy accomplishment of uniform heating throughout the layer, and it is generally from 5 to 50 g/m². The width of a web of gathered fiber layer should be constant to minimize the loss at both the ends after winding.

According to the apparatus of the present invention used in the practice of the above-mentioned process, there is provided as essential parts of an apparatus for producing hollow-cylindrically shaped fibrous articles stabilized by melt adhesion a belt conveyer means which transports a web of gathered fiber layer, a primary heating means comprising a plurality of infrared light heaters which forms a heating zone (mounted on adequate places along the conveyer belt) for heating a travelling web of gathered fiber layer on the conveyer belt, and a finishing part of winding which comprises first and second vertical pins which are provided at the outlet of said heating zone and at a position further ahead of it, respectively on both the side of the conveyer belt and are movable upwards and downwards imtermittently (they prevent the take-up rod on the conveyer belt from advancing but do not prevent the same from rotating by the action of the driving surface of the conveyer) and a secondary heating apparatus of one or more infrared light heaters facing the position of the take-up rod which is set by the first pins.

The drawing illustrates the above-mentioned apparatus.

In the drawing, 1 indictes a web of gathered fiber layer, 2 is a conveyer, 3 is a conveyer belt, 4 are infrared light heaters, A or A and B is a primary heating apparatus provided with infrared light heaters mounted at adequate positions along the conveyer belt, C is a secondary heating apparatus provided with infrared light heaters mounted so as to face a take-up rod 8 at the winding position, 5 are first pins, 6 are second pins, 7 are covers preventing radiation of heat from the heating zone and 9 indicates a carding machine illustrated as an example of a web of gathered-fiber-layer-supplying-equipment to the apparatus of the present invention.

As for the conveyer belt, those having a thermal coductivity of 1 Kcal/m, hour, ° C or smaller preferably 0.5 Kcal/m, hour, ° C and a dense structure may be employed. As materials forming such a conveyer belt, cotton (0.05 Kcal/m.hour.° C, hereinafter the indication of unit is omitted in this sentence), glass wool (0.04), Nylon resin (0.2), Tetron resin (0.13) or Teflon resin (0.2) may be used. When resins are made into fibers, their thermal conductivity becomes smaller. Additionally the thermal conductivities of iron, stainless and brass are 40, 14 and 100, respectively. As for structure of such a conveyer belt, those which are so dense that they do not contain many holes which may allow air to pass freely between both the surface of conveyer belt, are not contained, will be useful; namely materials having mesh comparable to woven fabrics may be adequately employed. As for thickness of conveyer belt a thinner one will serve the purpose of energy saving because of a smaller heat capacity as long as it has a strength sufficient as a conveyer belt. A conveyer belt produced by coating a metallic material such as stainless steel with a fiber material as mentioned above may also be employed so long as it satisfies the requirements of the conveyer belt of the present invention.

When a conveyer belt of this kind is used, infrared light irradiation from above alone can accomplish sufficient heating of the web of gathered fiber layer because of less heat radiation from the belt surface. Further it is possible to create a slight temperature difference so as to bring the lower-melting component of composite fibers in the upper layer part to the molten state and the same in the lower layer part to a state which is close to the molten state but slightly ahead of melting. Therefore, in case of such a conveyer belt, among the primary heating apparatuses, B part mounted below the conveyer belt is not necessary.

Materials of a conveyer belt used as the conveyer belt, those having many holes for free air passage are suitable. Conveyer belts made of such materials include, besides wire net belts, wire conveyer belts, and plates having many holes may be also used. As for the raw material, heat-resistant synthetic resins may also be used in addition to metals. When conveyer belts of this type are used, radiation of heat is unavoidable to some extent because of free air passage, and hence B part which supplementarily heat the back side of the belt by irradiation from below the conveyer belt is necessary in the primary heating apparatus. The heat sources of B are installed over a zone corresponding to at least 1/5 the zone occupied by A. Too many heaters are not necessary, because an excessive heating of the lower part of the web of gathered fiber layer takes place when all of them are used. In order to make the heating by the B part as effective as possible at the time of winding, these infrared heaters are preferably so installed that the end of the B group coincides to the end of A part.

When belt conveyers of this type are used, it is possible to give a rugged pattern on the surface of the wound up article by pressing it n a conveyer surface while in rotation after a web of gathered fiber layer is wound up on a take-up rod.

The action of the apparatus of the present invention will be explained as follows. From a supplying apparatus such as, for example, a carding machine 9 shown in the drawing, a web is supplied onto a conveyer belt. The upper part and the lower part of web of gathered fiber layer are appropriately heated by a primary heating apparatus A or A and B of which heating intensity has been adjusted and said web is wound up on a take-up rod 8 at the end of the primary heating zone. The take-up rod 8 is hindered to move forward on the conveyer by the pins 5 crossing at right angles therewith at both the ends thereof, but is rotated at a constant position by the driving of conveyer to which the take-up rod is pressed by its own weight, and thus it winds up the web of gathered fiber layer. While winding proceeds, additional heating of the back surface of the textile sheet is carried out by a secondary heating apparatus installed to face the winding position of the gathered fiber layer. Thus the lower-melting component is brought into the molten state sufficient to accomplish complete hot melt adhesion with a web of gathered fiber layer wound thereupon subsequently. When winding has been completed, the first pins 5 are moved down (by means of an air cylinder, etc.) allowing the wound up articles to move forward and the web of gathered fiber layer is cut off with a knife or a heated wire, etc.

Thereafter a new take-up rod is placed to start winding. The wound up article may be allowed to cool at another appropriate place, or it may be cooled while rotating on the conveyer belt at the position of the second pins 6 in the drawing. The take-up rod is manually drawn out from the wound up article after cooling.

EXAMPLE 1

A web having a Metsuke of 20 g/m² and a width of 80 cm and consisting of a side-by-side type composite fiber of polypropylene and polyethylene having a circumferential ratio of polyethylene portion of 70% in a cross section denier of 19 and cut length of 64 n/m, was heated to 140° C – 150° C by using an apparatus of the present invention with a wire net belt. Whereby only the polyethylene portion present in the part other than the lower part of the web into the molten state, 48 m of the web was wound up on a stainless core of take-up rod (30 mm φ) of 4 Kg weight per meter while applying a pressure by way of its own weight of wound up article. The outer diameter thereof was 70 mm. The wound up article was then allowed to cool for 5 minutes and the core was drawn out. Thus three hollow-cylindrically shaped fibrous articles having 30 mm inner diameter, 70 mm outer diameter and 240 grams weight were obtained by cutting into length of 250 mm. Resultant shaped article is extremely rigid and was neither broken nor bent when struck on a desk.

This fibrous shaped article was used as a cartridge filter and a stirred aqueous suspension prepared by adding the following three kinds of owder into water is passed from the outer surface to the hollow portion at the rate of 2000 1 per hour.

carborandom, 200 mesh, 74 μ or greater; 90%
grinding particle, 5 – 15 μ; 90%
active carbon powder, 43 μ or smaller 70 – 80%

In order to measure the size of particles which pass through the filter, 100 ml of filtrate is taken up and particles are collected on a filter paper by suction filtration. A great number of particles approximately 20 μ or smaller in size were observed under a microscopic measurement.

EXAMPLES 2 AND 3

Using a side-by-side type composite fiber of the same composite structure as Example 1 consisting of polypropylene and polyethylene but having a difference only in denier (6 denier in Example 2 and 3 denier in Example 3), cylindrically shaped fibrous articles having a 30 mm inner diameter, a 70 mm outer diameter and 240 g weight were obtained according to the same procedure as Example 1 except that a hot wind is used as a heating source and additional rolling of a wound-up article on a fine mesh wire net was carried out in the atmosphere of hot wind after winding up. When the particle size of material which can pass through this shaped article was measured in the same manner as Example 1, many particles of approximately 9 μ or smaller were observed in case of the former (Example 2) and only several particles of approximately 5 μ or smaller in case of the latter (Example 3).

EXAMPLE 4

A mixture of 70% of the same composite fiber as that of Example 3 and 30% of common polypropylene fiber having the same denier and length was used as a web of gathered fiber layer, and a hollow-cylindrically shaped fibrous articles, a 30 mm inner diameter, a 70 mm outer diameter, a 250 mm length and 200 g weight were produced by using the apparatus of the present invention with a cotton conveyer belt according to the same procedure as Example 1 except for about 10° C lowered heating temperature. A great number of particles having approximately 10 μ or smaller in size were observed among the particle having passed the hollow-cylindrically shaped fiber article of the present invention.

EXAMPLE 5

Hollow-cylindrically shaped fibrous articles were produced from the same web as Example 1 using the apparatus of the present invention with a cotton conveyer belt. Production conditions were the same as in Example 1 except for the following points: The infrared heaters of the secondary heating apparatus were gradually moved to be separated from the take-up rod with the progress of winding so that the distance between the take-up rod and the heaters was 8 cm at the start of winding and 22 cm at the end thereof. When the vacant space proportion of the inner side and outer side of the shaped article thus obtained was measured, they were 0.63 and 0.78, respectively (a rectangular form having a size of 10 mm × 20 mm × 5 mm (in thickness) was cut off from each part and weighted for the calculation). Thus a hollow-cylindrically shaped fibrous article with density gradient was obtained.

What is claimed is:

1. A process for producing a hollow-cylindrically shaped fibrous articles stabilized by hot melt adhesion which comprises passing a web of gathered fiber layer having a fixed width, carried on a conveyer belt through a heating zone, heating said web of gathered fiber layer in such a way that a lower-melting component of composite fiber contained in the lower part of said web contacting the conveyer belt is in the state close to its melting point but not in the molten state and a lower-melting component contained in the upper part of said web is in the molten state, while separating said web from the conveyer belt, winding up said web on a take-up rod in such a way that the upper surface thereof occupies the inner side of the winding, further heating, during the course of winding, the lower part of the web having been contacted with the surface of the conveyer belt which is exposed to the air after the separation, adjusting the vacant space proportion during the course of the above-mentioned steps or after completion of winding, cooling the wound up article after the adjustment of the vacant space proportion of final winding, and drawing out the take-up rod from the shaped product, said web of gathered fiber layer containing at least 10% hot-melt-adhesive composite fiber consisting of a lower-melting component, and a higher-melting component.

2. A process for producing hollow-cylindrically shaped fibrous articles described in claim 1 wherein a web of gathered fiber layer is wound up by rotating a take-up rod by means of surface driving of the conveyer belt which is exerted to said take-up rod through the medium of said web at a certain position on the conveyer belt and pressing said web by the own weight of resulting winding.

3. A process for producing hollow-cylindrically shaped fibrous articles described in claim 1 wherein a desirable vacant space proportion is obtained by the adjustment of heating grade to said web of gathered fiber layer.

4. A process for producing hollow-cylindrically shaped fibrous articles described in claim 1 wherein said web of gathered fiber layer is wound up on a take-up rod by changing gradually the heating grade to said web to give the gradient vacant space proportion to the product.

5. A process for producing a hollow-cylindrically shaped fibrous article described in claim 4 wherein said web of gathered fiber layer is wound up while keeping the heating grade to said web constant during its travel on the conveyer belt and changing the heating grade after separation from the conveyer belt by changing a distance of location of heating sources from said web with elapse of time to give a gradient vacant space proportion to the product.

6. A process for producing a hollow-cylindrically shaped fibrous article described in claim 1 wherein ruggedness is imparted to the surface of the shaped article by rolling it on a rugged surface while holding a temperature of winding.

7. A process for producing a hollow-cylindrically shaped fibrous article described in claim 6 wherein said shaped fibrous article is caused to contact with a roller having on the surface many adjacent ridges and grooves on the circumference thereof, corresponding to the above-mentioned ridges and grooves on the outer surface.

8. A process for producing a hollow-cylindrically shaped fibrous article stabilized by hot melt adhesion described in claim 1 wherein the width of said web of gathered fiber layer is an integer time as wide as that of the length of resultant hollow-cylindrically shaped fibrous article and said web, after being heated, wound up, cooled, and separated from a take-up rod, is cut into a necessary length.

9. A method for producing a hollow-cylindrically shaped fibrous article according to claim 1 wherein production is carried out in continuous manner without stopping heating and movement of said web of gathered fiber layer by moving a formed winding from a winding site after cutting a web of gathered fiber layer at a position before said winding site when winding is complete, supplying pre-heated empty take-up rod to a empty winding site to cause it to rotate, starting the next winding by allowing the loading end of said web of gathered fiber layer to coil around the take-up rod by the formation of adhesion of the hot-melt-adhesive fiber included in the web of gathered fiber layer present near the cut end with the hot take-up rod, subjecting said moved winding to the steps of cooling and others which follows said cooling step.

* * * * *